(12) United States Patent
Kim et al.

(10) Patent No.: US 11,305,647 B2
(45) Date of Patent: Apr. 19, 2022

(54) FOLDABLE BRAKE PEDAL APPARATUS FOR AUTONOMOUS VEHICLES

(71) Applicants: HYUNDAI MOTOR COMPANY, Seoul (KR); KIA MOTORS CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA MOTORS CORPORATION, Seoul (KR); Kyung Chang Industrial Co., Ltd., Daegu (KR)

(*) Notice: Subject to any disclaimer, the term of this patent is extended or adjusted under 35 U.S.C. 154(b) by 0 days.

(21) Appl. No.: 17/147,880

(22) Filed: Jan. 13, 2021

(65) Prior Publication Data

US 2022/0048384 A1 Feb. 17, 2022

(30) Foreign Application Priority Data

Aug. 12, 2020 (KR) .................. 10-2020-0101017

(51) Int. Cl.
*B60K 26/02* (2006.01)
*G05G 1/42* (2008.04)

(52) U.S. Cl.
CPC .............. *B60K 26/02* (2013.01); *G05G 1/42* (2013.01); *B60K 2026/026* (2013.01)

(58) Field of Classification Search
CPC . B60R 21/09; G05G 1/42; G05G 1/40; G05G 5/005; B60K 2026/026; B60K 26/02; B60T 7/06; B60T 7/02
See application file for complete search history.

(56) References Cited

U.S. PATENT DOCUMENTS

| | | | |
|---|---|---|---|
| 1,156,990 A * | 10/1915 | Foljambe | G05G 1/30 74/560 |
| 6,179,079 B1 * | 1/2001 | Basnett | B60N 3/066 180/90.6 |
| 6,182,525 B1 | 2/2001 | Bowers et al. | |
| 6,364,047 B1 | 4/2002 | Bortolon | |
| 9,283,934 B2 | 3/2016 | Shand | |
| 10,739,011 B2 | 8/2020 | Cowan et al. | |
| 10,906,514 B1 * | 2/2021 | Kim | B60T 7/06 |

(Continued)

FOREIGN PATENT DOCUMENTS

FR 2981889 1/2014
KR 10-2017-0137427 12/2017

*Primary Examiner* — Thomas C Diaz
(74) *Attorney, Agent, or Firm* — Lempia Summerfield Katz LLC

(57) ABSTRACT

A foldable brake pedal apparatus for autonomous vehicles provides a manual driving mode and an autonomous driving mode. In the manual driving mode, a driver directly drives a vehicle, a pedal pad protrudes from a pedal housing and pops up to be exposed to the driver side such that the driver can manipulate the pedal pad. And in the autonomous driving mode, the driver does not directly drive the vehicle, the pedal pad is inserted into the pedal housing and is in a hidden state in which exposure of the pedal pad toward the drive side is inhibited such that the driver cannot manipulate the pedal pad.

20 Claims, 11 Drawing Sheets

(56) References Cited

U.S. PATENT DOCUMENTS

| | | | |
|---|---|---|---|
| 10,913,419 B2* | 2/2021 | Mullen | B60N 3/044 |
| 10,946,741 B1* | 3/2021 | Kim | B60T 7/06 |
| 10,988,097 B2* | 4/2021 | Ghaffari | B60R 21/09 |
| 2001/0015111 A1* | 8/2001 | Rixon | G05G 1/405 |
| | | | 74/512 |
| 2003/0110879 A1* | 6/2003 | Massey | G05G 1/405 |
| | | | 74/512 |
| 2004/0259687 A1 | 12/2004 | Ritter et al. | |
| 2008/0147287 A1 | 6/2008 | Park et al. | |
| 2009/0223319 A1 | 9/2009 | Choi | |
| 2010/0139445 A1 | 6/2010 | Kim et al. | |
| 2011/0132134 A1 | 6/2011 | Kim et al. | |
| 2013/0125682 A1 | 5/2013 | Kim et al. | |
| 2014/0311278 A1 | 10/2014 | Min et al. | |
| 2014/0316648 A1 | 10/2014 | Min | |
| 2014/0373667 A1 | 12/2014 | Kim | |
| 2015/0107402 A1 | 4/2015 | Leem | |
| 2015/0253804 A1* | 9/2015 | Baur | G05G 1/40 |
| | | | 180/329 |
| 2019/0118852 A1* | 4/2019 | Suzuki | B60T 7/042 |
| 2019/0310678 A1* | 10/2019 | Wojciechowski | B60K 26/021 |

* cited by examiner

FOLDABLE BRAKE PEDAL APPARATUS FOR AUTONOMOUS VEHICLES

CROSS-REFERENCE TO RELATED APPLICATION

This application claims priority to and the benefit of Korean Patent Application No. 10-2020-0101017, filed on Aug. 12, 2020, the entire contents of which are incorporated herein by reference.

FIELD

The present disclosure relates to a foldable brake pedal apparatus for autonomous vehicles.

BACKGROUND

The statements in this section merely provide background information related to the present disclosure and may not constitute prior art.

An autonomous vehicle is a smart vehicle to which autonomous driving technology enables the vehicle to move to a destination while a driver does not directly manipulate a steering wheel, an accelerator pedal, or a brake.

In the case when an autonomous driving situation is generally realized, it is possible to switch between a manual driving mode, in which a driver directly drives a vehicle, and an autonomous driving mode, in which a vehicle moves to a destination, while a driver does not directly drive the vehicle.

In the autonomous driving mode, the driver may stretch out their legs in order to take a comfortable rest. When pedals (an accelerator pedal and a brake pedal) located in a lower space of a driver's seat remain exposed into the interior of the vehicle, we have discovered that relaxation of the driver may be disturbed.

In addition, the autonomous driving mode is a mode in which the driver does not manipulate the pedals (the accelerator pedal and the brake pedal) of the vehicle. If the driver manipulates the pedals during autonomous driving, a vehicle controller determines that the driver wishes to finish autonomous driving and to directly drive the vehicle, and finishes control for autonomous driving.

Since the pedals of the vehicle are installed in the lower space of the driver's seat in the state of being exposed, we have discovered that the driver may unintentionally manipulate the pedals in the autonomous driving mode (unintentional manipulation of the pedals). In this case, an accident may occur depending on a road situation or the distance between vehicles.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides a foldable brake pedal apparatus for autonomous vehicles configured such that, in a manual driving mode in which a driver directly drives a vehicle, a pedal pad protrudes from a pedal housing and thus pops up to be exposed to the driver side such that the driver can manipulate the pedal pad. In an autonomous driving mode in which the driver does not directly drive the vehicle, the pedal pad is inserted into the pedal housing and thus is in a hidden state in which exposure of the pedal pad toward the drive side is inhibited such that the driver cannot manipulate the pedal pad. In the autonomous driving mode, it is possible for the driver to take a comfortable rest, and unintentional manipulation of the pedal is inhibited in the autonomous driving mode, whereby it is possible to improve safety.

The present disclosure provides a foldable brake pedal apparatus using a high-load spring module to generate stepping force, wherein a low-capacity motor used in a general foldable accelerator pedal apparatus is usable, whereby it is possible to reduce cost.

The present disclosure further provides a foldable brake pedal apparatus configured such that an actuator is installed so as to be maximally parallel to the high-load spring module, and the high-load spring module and the actuator are connected to each other via a rotary lever located between the high-load spring module and the actuator, whereby it is possible to reduce the overall external size of the pedal apparatus based on an efficient layout structure, increase the pop-up speed of the pedal pad based on a short stroke of the actuator, and improve responsiveness at the time of pop up.

In accordance with the present disclosure, a foldable brake pedal apparatus for autonomous vehicles includes a pedal housing fixedly installed in a lower space of a driver's seat, a high-load spring module located in the pedal housing, the high-load spring module being installed so as to be linearly movable relative to the pedal housing, the high-load spring module being configured to generate stepping force, a pedal pad coupled to one end of the high-load spring module, the pedal pad being configured to be manipulated by a foot of a driver, the pedal pad being configured to move together with the high-load spring module when the high-load spring module linearly moves so as to switch between a hidden state in which the pedal pad is inserted into the pedal housing and a pop-up state in which the pedal pad protrudes from the pedal housing, an actuator fixedly installed in the pedal housing so as to be located at the side of the high-load spring module, the actuator being configured to generate power desired for the high-load spring module to linearly move, and a rotary lever configured to interconnect the high-load spring module and the actuator in order to transmit the power from the actuator to the high-load spring module.

The foldable brake pedal apparatus may further include an actuator control printed circuit board (PCB) fixedly installed in the pedal housing, the actuator control PCB being electrically connected to the actuator, the actuator control PCB being configured to control operation of the actuator.

The foldable brake pedal apparatus may further include a plurality of pedal sensors fixedly installed in the pedal housing, each of the pedal sensors being connected to the pedal pad via a sensor lever, each of the pedal sensors being configured to detect operation of the pedal pad through rotation of the sensor lever when the pedal pad linearly moves and to generate a signal related to braking.

The pedal pad may be a linear protrusion type pad configured to move through a housing hole formed in the pedal housing in a linear direction so as to protrude from the pedal housing.

The foldable brake pedal apparatus may further include a return spring disposed so as to extend in a longitudinal direction of the high-load spring module, opposite ends of the return spring being coupled to the other end of the high-load spring module and the pedal housing, the return spring being configured to provide elastic force to the high-load spring module such that the high-load spring module is movable in a direction in which the high-load spring module is inserted into the pedal housing.

The pedal housing may be provided with a housing hole configured to allow the pedal pad to extend therethrough, the pedal housing may be provided with a guide hole extending in a direction in which the pedal pad extends through the housing hole, and the high-load spring module may be provided with a spring projection inserted into the guide hole so as to move along the guide hole.

The actuator may be installed parallel to the high-load spring module or may be installed almost in parallel to the high-load spring module, and the rotary lever may be installed so as to interconnect the high-load spring module and the actuator between the high-load spring module and the actuator.

The actuator may include a linear type motor fixedly installed in the pedal housing and a plunger configured to advance and retreat when the linear type motor is operated, the plunger being rotationally coupled to one end of the rotary lever, wherein the rotary lever may be rotated relative to the pedal housing when the plunger advances and retreats, the high-load spring module may move linearly relative to the pedal housing according to rotation of the rotary lever, and the pedal pad may move linearly together with the high-load spring module such that the pedal pad switches between a hidden state, in which the pedal pad is inserted into the pedal housing, and a pop-up state, in which the pedal pad protrudes from the pedal housing.

When supply of power to the linear type motor is interrupted, the plunger may be inserted into the linear type motor, i.e. the plunger may retreat, the state in which the high-load spring module is supported by the rotary lever may be released at the time of retreat of the plunger such that the high-load spring module is inserted into the pedal housing through linear movement by elastic force of the return spring, and the pedal pad may be inserted into the pedal housing through linear movement together with the high-load spring module such that the pedal pad is in the hidden state.

When power is supplied to the linear type motor, the plunger may protrude from the linear type motor, i.e. the plunger may advance, the high-load spring module may protrude from the pedal housing through linear movement by rotation of the rotary lever at the time of advance of the plunger, and the pedal pad may protrude from the pedal housing through linear movement together with the high-load spring module such that the pedal pad is in the pop-up state.

The high-load spring module and the pedal pad may linearly move together due to advance and retreat of the plunger based on operation of the linear type motor, and the pedal sensor may not generate a signal related to braking in order to inhibit unintentional manipulation when the sensor lever connected to the pedal pad is rotated at the time of linear movement of the pedal pad. In the situation in which the pedal pad is in the pop-up state and the plunger neither advances nor retreats as the result of the linear type motor not being operated, the pedal sensor may generate a signal related to braking only when the pedal pad linearly moves through driver manipulation and the rotary lever connected to the pedal pad is rotated.

The rotary lever may be installed so as to be rotatable about a lever pin fixed to the pedal housing. The rotary lever may include a first lever portion extending to one side based on the lever pin, the first lever portion being configured to contact the spring projection to be connected to the high-load spring module, and a second lever portion extending to the other side based on the lever pin, the second lever portion being rotatably coupled to the plunger.

The length of the first lever portion may be greater than the length of the second lever portion in order to increase a pop-up speed of the pedal pad based on a short stroke of the actuator.

The lever pin may be installed so as to be located between a longitudinal axis of the actuator and a longitudinal axis of the high-load spring module in order to avoid interference with the plunger and the high-load spring module.

When the pedal pad is in the pop-up state, a contact portion formed at the end of the first lever portion may contact the spring projection and thus may support the high-load spring module. When the driver steps on the pedal pad while the pedal pad is in the pop-up state, a load may be generated at the high-load spring module in a direction in which the pedal pad is inserted into the pedal housing along the guide hole. The first lever portion may be disposed so as to extend in a component force direction of the load generated at the high-load spring module while the pedal pad is in the pop-up state such that the first lever portion supports most of the load generated at the high-load spring module in order to reduce transmission of the load to the actuator.

The contact portion formed at the end of the first lever portion may be in contact with the spring projection to support the high-load spring module while the pedal pad is in the pop-up state, and the contact portion of the first lever portion may be rounded so as to have an arc identical to the radius of rotation of the first lever portion based on the lever pin.

A lower corner of the contact portion may be formed as a protrusion configured to protrude out of the radius of rotation of the first lever portion, the protrusion serving as a stopper configured to restrict the position of the rotary lever through contact with the spring projection.

The high-load spring module may include an outer cylinder formed such that the spring projection, configured to contact the first lever portion of the rotary lever and to be inserted into the guide hole, protrudes outwards from the outer cylinder, an inner cylinder having one end inserted into the outer cylinder, the inner cylinder being coupled to the outer cylinder so as to be movable in a longitudinal direction of the outer cylinder, a spring seat inserted into the inner cylinder, the spring seat being installed so as to be movable in a longitudinal direction of the inner cylinder, a connection rod configured to rotatably interconnect the spring seat and the pedal pad, a first spring located in the outer cylinder, opposite ends of the first spring being supported by the outer cylinder and the inner cylinder, a second spring located in the inner cylinder, opposite ends of the second spring being supported by the inner cylinder and the spring seat, a first damper fixedly installed in the outer cylinder so as to be spaced apart from the inner cylinder, and a second damper fixedly installed in the inner cylinder so as to be spaced apart from the spring seat.

Spring force of the second spring may be set to be greater than spring force of the first spring.

When the pedal pad linearly moves toward the pedal housing as the result of driver manipulation of the pedal pad in the pop-up state in which the pedal pad protrudes from the pedal housing, the first spring may be compressed first to generate primary stepping force. When the second spring is compressed after the first spring is compressed, secondary stepping force higher than the primary stepping force may be generated. When the first damper and the second damper are compressed after the second spring is compressed, tertiary stepping force higher than the secondary stepping force may be generated as additional stepping force.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
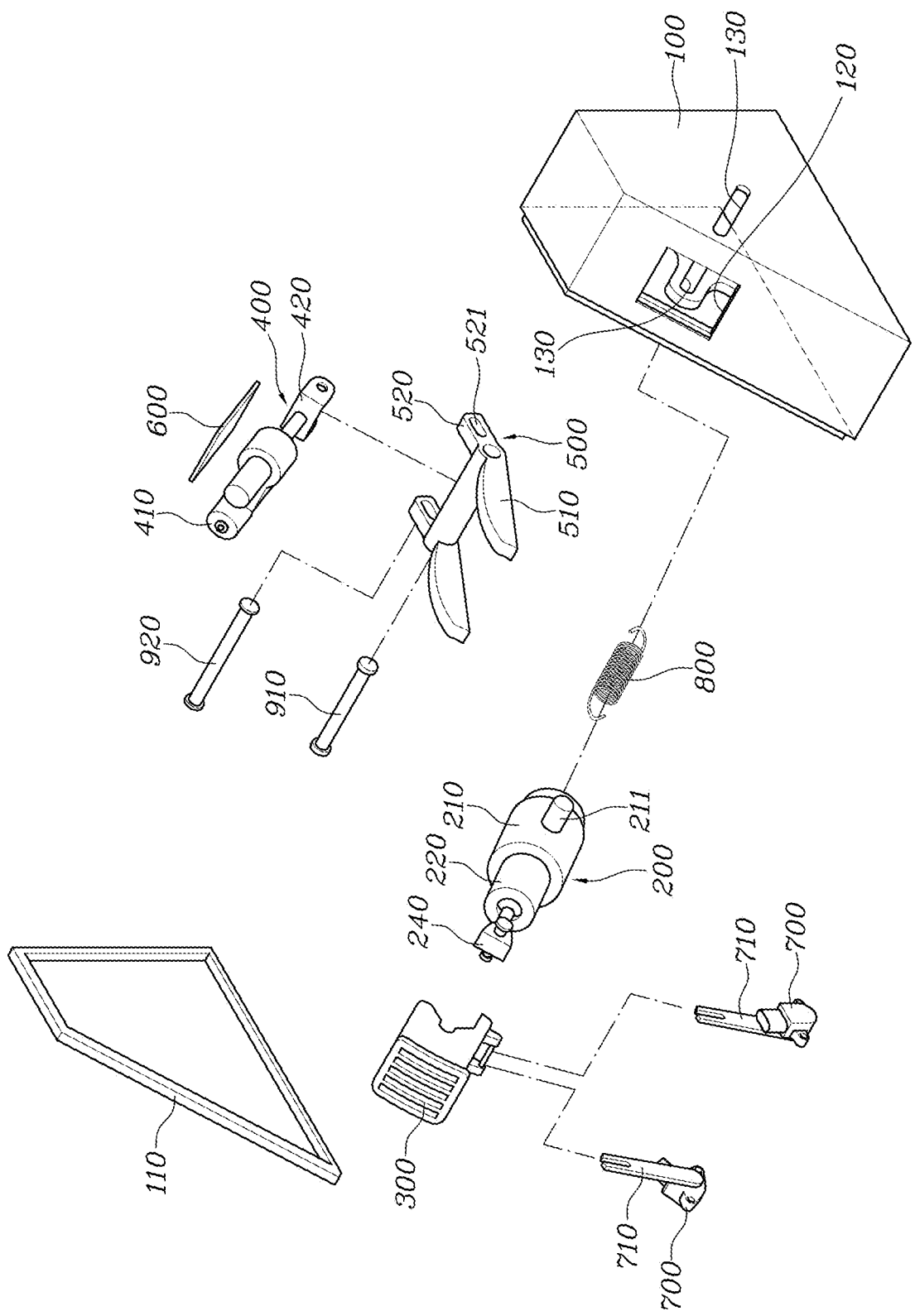
FIG. 1 is an exploded perspective view of a foldable brake pedal apparatus for autonomous vehicles according to one form of the present disclosure.
Figure 2:
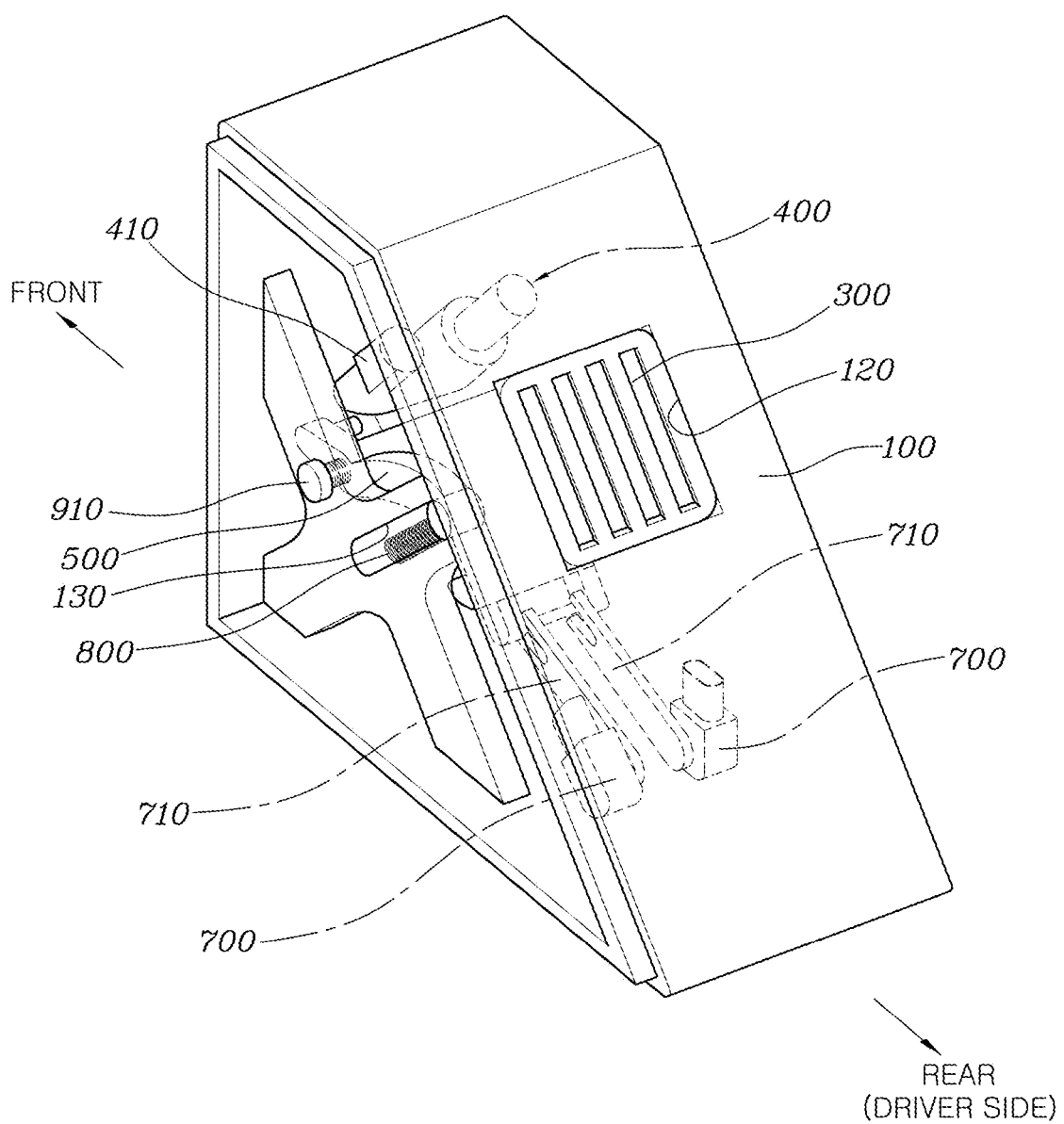
FIG. 2 is an assembled perspective view of FIG. 1, showing a hidden state in which a pedal pad is inserted into a pedal housing.
Figure 3:
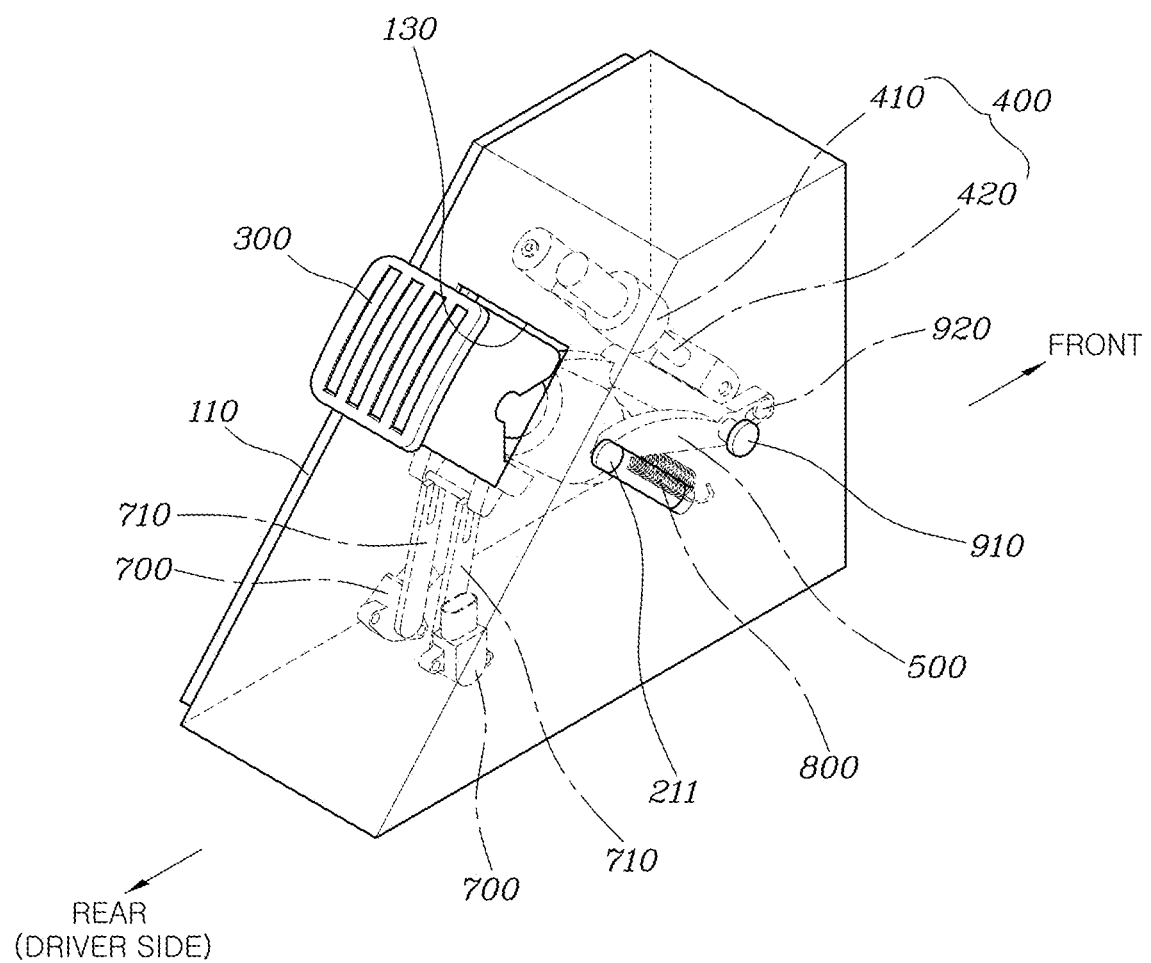
FIG. 3 is a perspective view showing a pop-up state in which the pedal pad protrudes from the pedal housing in FIG. 2.
Figure 4:
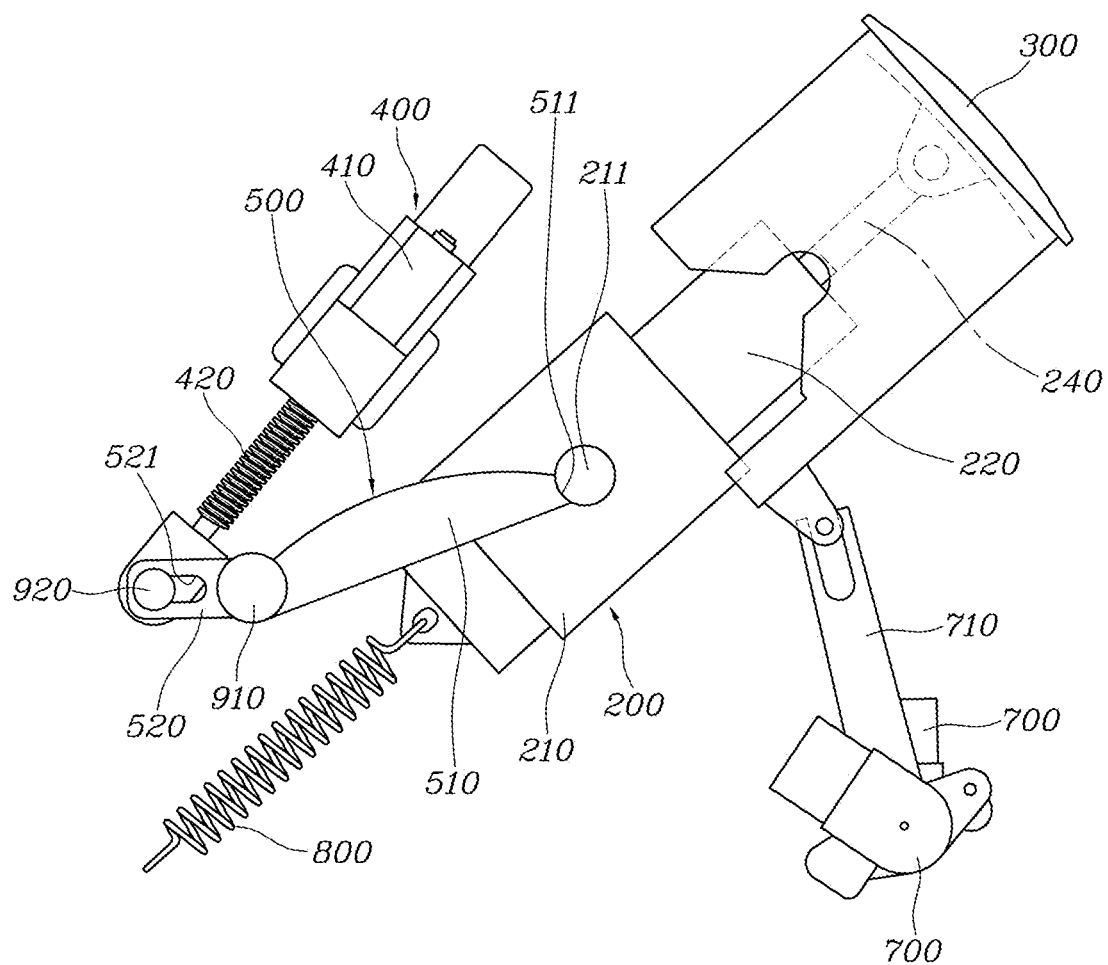
FIG. 4 is a side view showing the state in which the pedal housing is removed from FIG. 3.
Figure 5:
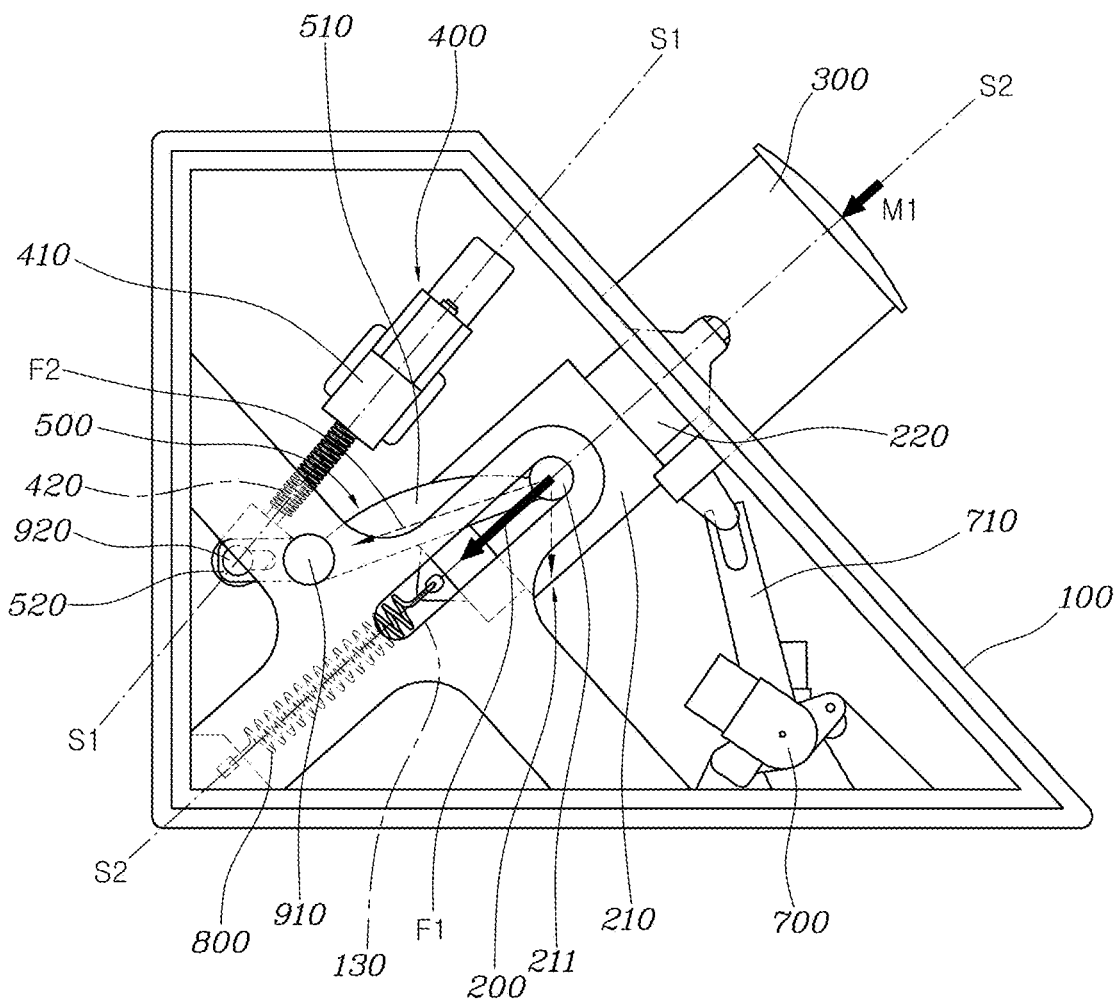
FIG. 5 is a side view of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Since the present disclosure may be variously modified and may have various forms, specific forms will be shown in the drawings and will be described in detail in this specification or this disclosure. However, the forms according to the concept of the present disclosure are not limited to such specific forms, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific forms, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

A controller (control device) according to one form of the present disclosure may be realized by a non-volatile memory (not shown) configured to store an algorithm configured to control the operation of various elements of a vehicle or data on software commands for executing the algorithm and a processor (not shown) configured to perform the operation, which will be described below, using the data stored in the memory. Here, the memory and the processor may be realized as individual chips. Alternatively, the memory and the processor may be realized as a single integrated chip. The processor may include one or more processors.

Hereinafter, a foldable brake pedal apparatus for autonomous vehicles according to one form of the present disclosure will be described with reference to the accompanying drawings.

As shown in FIGS. 1 to 11, the foldable brake pedal apparatus for autonomous vehicles according to the present disclosure includes a pedal housing 100 fixedly installed in a lower space of a driver's seat, a high-load spring module 200 located in the pedal housing 100, the high-load spring module 200 being installed so as to be linearly movable relative to the pedal housing 100, the high-load spring module 200 being configured to generate stepping force, a pedal pad 300 coupled to one end of the high-load spring module 200, the pedal pad 300 being configured to be manipulated by a foot of a driver, the pedal pad 300 being configured to move together with the high-load spring module 200 when the high-load spring module 200 linearly moves so as to switch between a hidden state in which the pedal pad 300 is inserted into the pedal housing 100 and a pop-up state in which the pedal pad 300 protrudes from the pedal housing 100, an actuator 400 fixedly installed in the pedal housing 100 so as to be located at the side of the high-load spring module 200, the actuator 400 being configured to generate power desired for the high-load spring module 200 to linearly move, and a rotary lever 500 configured to interconnect the high-load spring module 200 and the actuator 400 in order to transmit the power from the actuator 400 to the high-load spring module 200.

The pedal housing 100 is formed in the shape of a hollow box. The high-load spring module 200, the actuator 400, and the rotary lever 500 are installed in the pedal housing 100. In addition, an actuator control printed circuit board (PCB), a pedal sensor, and a return spring, a description of each of which will follow, are also installed in the pedal housing 100. A cover 110 is detachably coupled to one side of the pedal housing 100.

In addition, the foldable brake pedal apparatus according to one form of the present disclosure further includes an actuator control PCB 600 fixedly installed in the pedal housing 100, the actuator control PCB 600 being electrically connected to the actuator 400, the actuator control PCB 600 being configured to control operation of the actuator 400.

The actuator control PCB 600 is electrically connected to a power supply, such as a battery, via a wire.

In addition, the foldable brake pedal apparatus according to one form of the present disclosure further includes a plurality of pedal sensors 700 fixedly installed in the pedal housing 100, each of the pedal sensors 700 being connected to the pedal pad 300 via a sensor lever 710, each of the pedal sensors 700 being configured to detect operation (linear movement) of the pedal pad 300 through rotation of the sensor lever 710 when the pedal pad 300 linearly moves and to generate a signal related to braking.

When the pedal pad 300 linearly moves relative to the pedal housing 100, the sensor lever 710 connected to the pedal pad 300 is rotated.

A permanent magnet is coupled to the sensor lever 710, and a printed circuit board (PCB) is provided in the pedal sensor 700 so as to face the permanent magnet. The PCB is electrically connected to the power supply, such as the battery, via a wire.

Consequently, when the pedal pad 300 linearly moves relative to the pedal housing 100 as the driver steps on the pedal pad 300, the sensor lever 710 connected to the pedal pad 300 is rotated, the position of the permanent magnet coupled to the sensor lever 710 is changed during rotation of the sensor lever 710, and the pedal sensor 700 detects the operation (linear movement) of the pedal pad 300 through a change in the intensity of a magnetic field based on a change in the rotational position of the permanent magnet and generates a signal related to braking.

The pedal sensor 700 according to one form of the present disclosure is a contact type pedal sensor connected to the pedal pad 300 via the sensor lever 710, which is a mechanical structure. However, a contactless type pedal sensor including only a permanent magnet and a PCB may be used as needed.

The pedal pad 300 is a linear protrusion type pad configured to move through a housing hole 120 formed in the pedal housing 100 in a linear direction so as to protrude from the pedal housing 100.

The housing hole 120 is formed through the rear surface of the pedal housing, which faces the driver. The pedal pad 300 is installed so as to linearly move through the housing hole 120.

Consequently, in the structure in which the rotary lever 500 is rotated by operation of the actuator 400, the high-load spring module 200 linearly moves due to rotation of the rotary lever 500, and the pedal pad 300 linearly moves together with the high-load spring module 200, the pedal pad 300 is in a hidden state in which driver manipulation is not possible when the pedal pad 300 is inserted into the pedal housing 100, and the pedal pad 300 is in a pop-up state in which driver manipulation is possible when the pedal pad 300 protrudes from the pedal housing 100.

In addition, the foldable brake pedal apparatus according to the present disclosure further includes a return spring 800 disposed so as to extend in a longitudinal direction of the high-load spring module 200, opposite ends of the return spring 800 being coupled to the other end of the high-load spring module 200 and the pedal housing 100, the return spring 800 being configured to provide elastic force to the high-load spring module 200 such that the high-load spring module 200 is movable in a direction in which the high-load spring module 200 is inserted into the pedal housing 100.

In one form, the return spring 800 is a coil spring configured to provide force desired to pull the high-load spring module 200 into the pedal housing 100. However, the present disclosure is not limited thereto.

The pedal housing 100 is provided with a guide hole 130 extending in a direction in which the pedal pad 300 extends through the housing hole 120. The high-load spring module 200 is provided with a spring projection 211 inserted into the guide hole 130 so as to move along the guide hole 130. Consequently, the high-load spring module 200 is installed so as to move linearly relative to the pedal housing 100 due to the spring projection 211 configured to move along the guide hole 130.

In the present disclosure, the actuator 400 is installed in parallel to the high-load spring module 200 or is installed almost in parallel to the high-load spring module 200. The rotary lever 500 is installed so as to interconnect the high-load spring module 200 and the actuator 400 between the high-load spring module 200 and the actuator 400.

In the structure in which the pedal pad 300 linearly moves to pop up from the pedal housing 100 or to be hidden in the pedal housing 100, as in the present disclosure, the pedal pad 300, the high-load spring module 200, and the actuator 400 are linearly arranged in most cases. Since such a linear installation structure requires a space having a large length desired for installation, the overall size of the pedal housing 100 is increased, whereby the overall external size of the pedal apparatus is increased.

In one form of the present disclosure, however, only the pedal pad 300 and the high-load spring module 200 are linearly connected to each other, the actuator 400 is installed at the side of the high-load spring module 200 so as to be maximally parallel thereto, and the high-load spring module 200 and the actuator 400 are connected to each other via the rotary lever 500 for power transmission. Consequently, it is possible to greatly reduce the size of the pedal housing 100 and the overall external size of the pedal apparatus based on an efficient layout structure.

The actuator 400 according to the present disclosure includes a linear type motor 410 fixedly installed in the pedal housing 100 and a plunger 420 configured to advance and retreat when the linear type motor 410 is operated, the plunger 420 being rotationally coupled to one end of the rotary lever 500.

The linear type motor 410 may be a linear motor. The linear type motor 410 is electrically connected to the power supply.

Consequently, the rotary lever 500 is rotated relative to the pedal housing 100 when the plunger 420 advances and retreats. When the rotary lever 500 is rotated, the high-load spring module 200 moves linearly relative to the pedal housing 100, and the pedal pad 300 connected to the high-load spring module 200 moves linearly together with the high-load spring module 200, whereby the pedal pad 300 switches between a hidden state in which the pedal pad 300 is inserted into the pedal housing 100 and a pop-up state in which the pedal pad 300 protrudes from the pedal housing 100.

In the present disclosure, the rotary lever 500 is installed so as to be rotatable about a lever pin 910 fixed to the pedal housing 100.

The rotary lever 500 includes a first lever portion 510 extending to one side based on the lever pin 910, the first lever portion 510 being configured to contact the spring projection 211 of the high-load spring module 200 to be connected to the high-load spring module 200, and a second lever portion 520 extending to the other side based on the lever pin 910, the second lever portion 520 being rotatably coupled to the plunger 420.

The plunger 420 and the second lever portion 520 are rotatably connected to each other via a connection pin 920. A pin hole 521 of the second lever portion 520, through which the connection pin 920 extends, is formed in the shape of a slot extending in a longitudinal direction of the second lever portion 520, whereby it is possible to reduce a difference in track between linear movement of the plunger 420 and rotational movement of the second lever portion 520.

The length of the first lever portion 510 of the rotary lever 500 is greater than the length of the second lever portion 520. As a result, it is possible to increase the pop-up speed of the pedal pad 300 based on a short stroke of the actuator 400, whereby it is possible to greatly improve responsiveness at the time of pop up.

The lever pin 901, which is the center of rotation of the rotary lever 500, may be installed so as to be located between a longitudinal axis S1 of the actuator 400 and a longitudinal axis S2 of the high-load spring module 200 in order to avoid interference with the plunger 420 and the high-load spring module 200.

When the pedal pad 300 is in a hidden state, one side surface of the first lever portion 510 contacts the spring projection 211 and thus supports the high-load spring module 200. One side surface of the first lever portion 510 in contact with the spring projection 211 is rounded in the shape of a convex arc. When the pedal pad 300 is in a pop-up state, a contact portion 511 formed at the end of the first lever portion 510 contacts the spring projection 211 and thus supports the high-load spring module 200.

When the driver steps on the pedal pad 300 (arrow Ml of FIG. 5) while the pedal pad 300 is in a pop-up state and the contact portion 511 formed at the end of the first lever portion 510 is in contact with the spring projection 211, a load (arrow F1 of FIG. 5) is generated at the high-load spring module 200 in a direction in which the pedal pad 300 is inserted into the pedal housing 100 along the guide hole 130.

As described above, the first lever portion 510 according to the present disclosure is disposed so as to extend in a component force direction F2 of the load F1 generated at the high-load spring module 200 while the pedal pad 300 is in a pop-up state. Consequently, it is possible to support most of the load F1 generated at the high-load spring module 200 through the rotary lever 500, whereby it is possible to reduce transmission of the load F1 to the actuator 400. As a result, it is possible to improve durability of the linear type motor 410 while reducing capacity of the linear type motor 410, whereby it is possible to reduce weight and cost.

Figure 6:
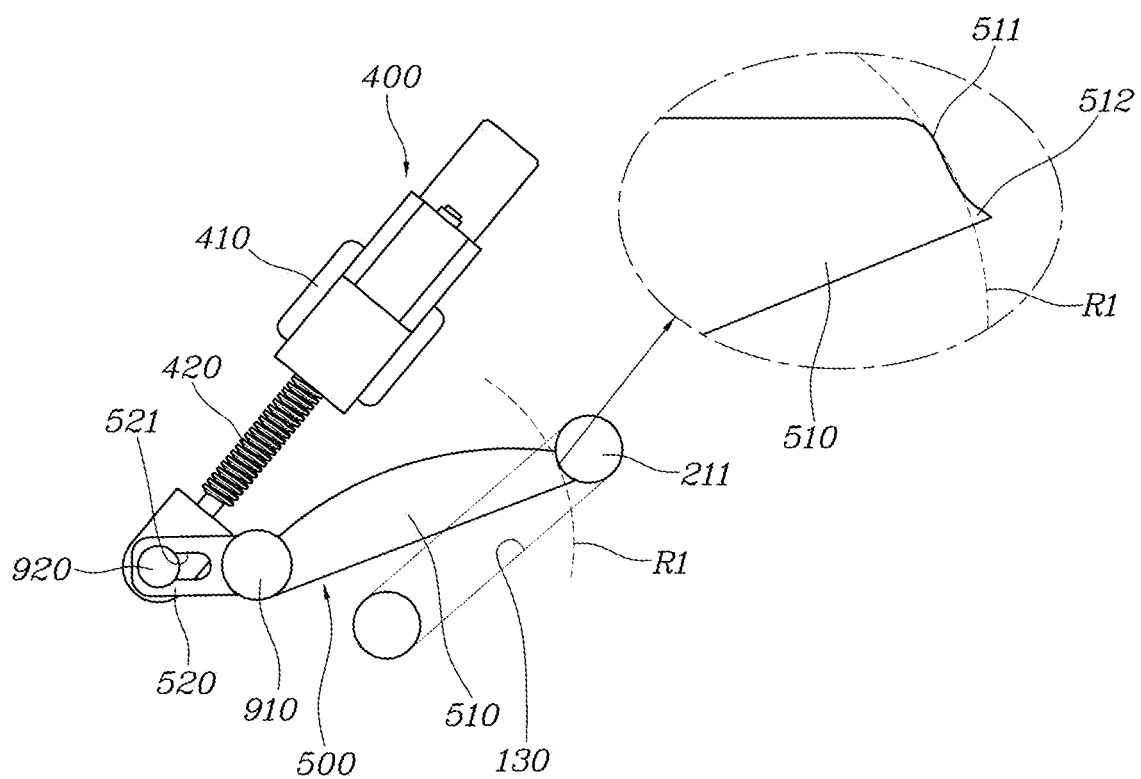
FIG. 6 is a view illustrating a rotary lever according to the present disclosure.

Meanwhile, in the structure in which the contact portion 511 formed at the end of the first lever portion 510 is in contact with the spring projection 211 to support the high-load spring module 200 while the pedal pad 300 is in a pop-up state, the contact portion 511 is rounded so as to have an arc identical to the radius of rotation R1 of the first lever portion 510 based on the lever pin 910, as shown in FIG. 6.

Consequently, the spring projection 211 is in contact with one side surface (a convexly rounded surface) of the first lever portion 510, and when passing over the upper corner of the contact portion 511 according to pop up of the pedal pad 300, the spring projection 211 moves downwards, rather than upwards. As a result, the spring projection 211 is more stably seated on the contact portion 511 of the first lever portion 510.

In addition, the lower corner of the contact portion 511 of the first lever portion 510 is formed as a protrusion 512 configured to protrude out of the radius of rotation R1 of the first lever portion 510. The protrusion 512 serves as a stopper configured to restrict the position of the rotary lever 500 through contact with the spring projection 211.

If no protrusion 512 is formed at the lower corner of the contact portion 511, whereby rotation of the rotary lever 500 is not restricted when the pedal pad 300 pops up, the first lever portion 510 is rotated in the state of deviating from the spring projection 211. In this case, the pop-up operation and the hiding operation of the pedal pad 300 are not performed.

For a brake pedal for vehicles, high load is desired for distinction from an accelerator pedal and safety at the time of manipulation. To this end, in one form of the present disclosure, the high-load spring module 200 is used to generate desired stepping force. Consequently, it is possible to use a low-capacity motor used in a general foldable accelerator pedal apparatus, whereby it is possible to reduce cost.

Figure 10:
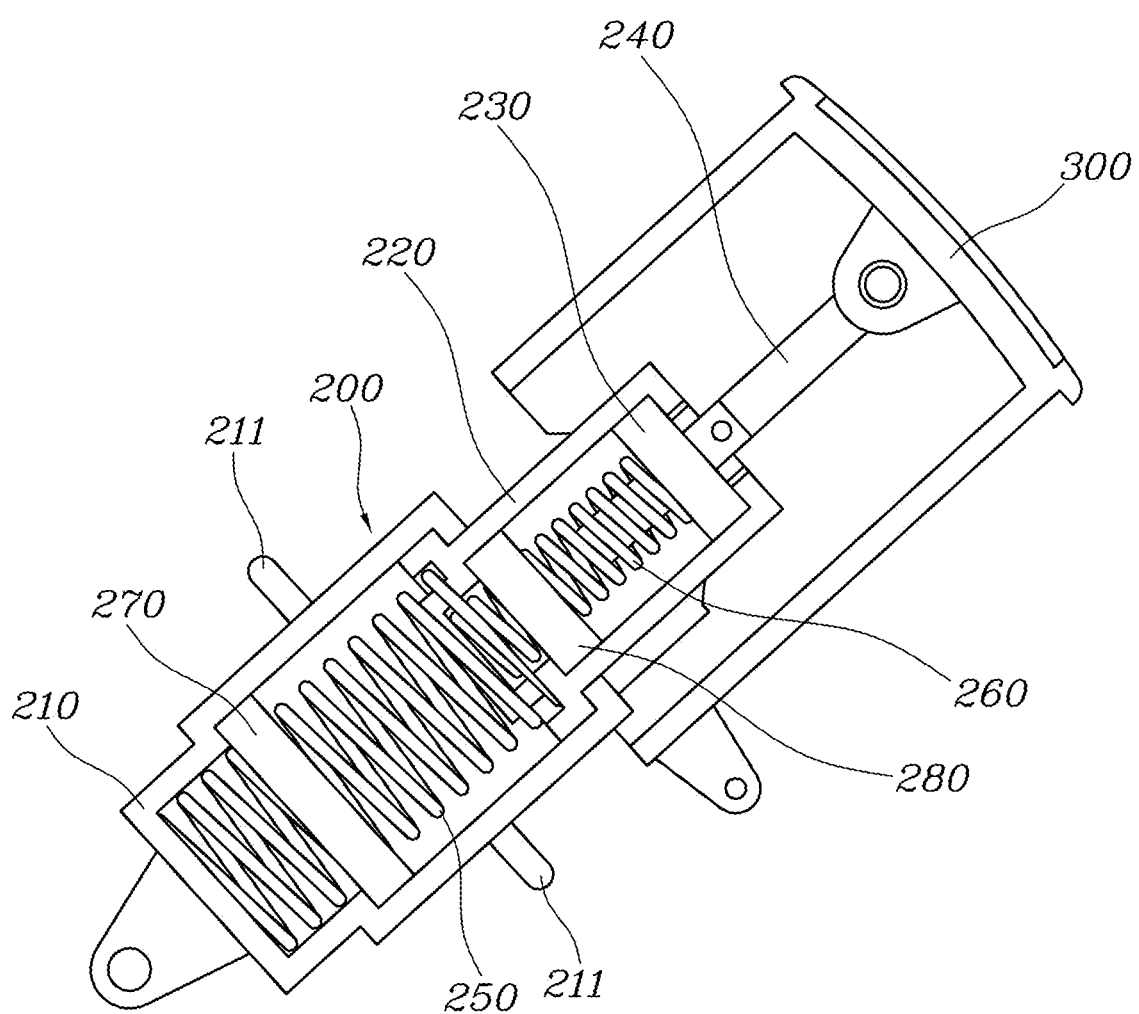
FIG. 10 is a view illustrating a high-load spring module according to one form of the present disclosure.

As shown in FIG. 10, the high-load spring module 200 used in the present disclosure includes an outer cylinder 210 formed such that the spring projection 211, configured to contact the first lever portion 510 of the rotary lever 500 and to be inserted into the guide hole 130 of the pedal housing 100, protrudes outwards from the outer cylinder 210, an inner cylinder 220 having one end inserted into the outer cylinder 210, the inner cylinder 220 being coupled to the outer cylinder 210 so as to be movable in a longitudinal direction of the outer cylinder 210, a spring seat 230 inserted into the inner cylinder 220, the spring seat 230 being installed so as to be movable in a longitudinal direction of the inner cylinder 220, a connection rod 240 configured to rotatably interconnect the spring seat 230 and the pedal pad 300, a first spring 250 located in the outer cylinder 210, opposite ends of the first spring 250 being supported by the outer cylinder 210 and the inner cylinder 220, a second spring 260 located in the inner cylinder 220, opposite ends of the second spring 260 being supported by the inner cylinder 220 and the spring seat 230, a first damper 270 fixedly installed in the outer cylinder 210 so as to be spaced apart from the inner cylinder 220, and a second damper 280 fixedly installed in the inner cylinder 220 so as to be spaced apart from the spring seat 230.

In the present disclosure, spring force of the second spring 260 is set to be greater than spring force of the first spring 250.

When the pedal pad 300 linearly moves toward the pedal housing 100 as the result of driver manipulation of the pedal pad 300 in a pop-up state in which the pedal pad 300 protrudes from the pedal housing 100, therefore, the first spring 250 is compressed first, whereby primary stepping force is generated. After the first spring 250 is compressed, the second spring 260 is compressed, whereby secondary stepping force higher than the primary stepping force is generated. After the second spring 260 is compressed, the first damper 270 and the second damper 280 are compressed finally, whereby tertiary stepping force higher than the secondary stepping force is generated as additional stepping force.

Figure 11:
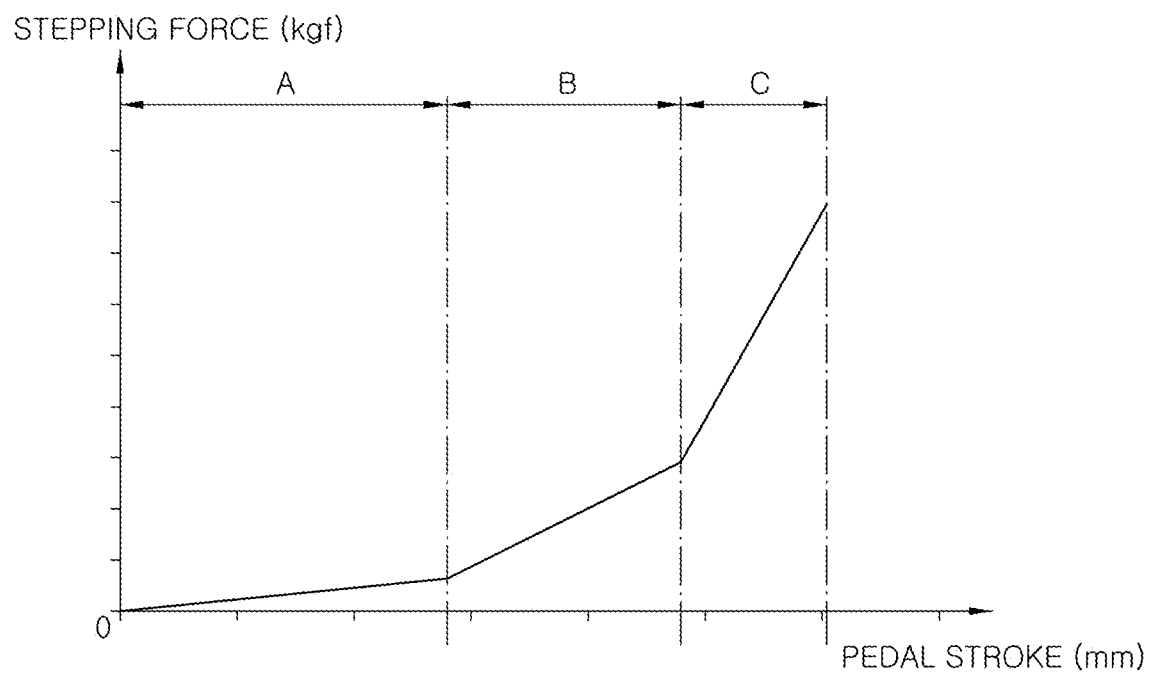
FIG. 11 is a stepping force graph of a brake pedal apparatus including the high-load spring module according to one form of the present disclosure.

FIG. 11 is a stepping force graph of the brake pedal in the case in which the high-load spring module 200 according to the present disclosure is used. Period A is a primary stepping force generation period based on compression of the first spring 250, period B is a secondary stepping force generation period based on compression of the second spring 260 after compression of the first spring 250, and period C is a tertiary stepping force generation period based on compression of the first and second dampers 270 and 280.

Period A is a period in which negative pressure of a conventional brake booster is generated, and is a period in which stepping force is low due to an energizing effect based on the negative pressure. Period B is a period in which the negative pressure of the conventional brake booster is extinguished, and is a period in which the negative pressure effect is low and thus stepping force is high. Period C is a period in which additional stepping force is generated due to compression of rubber dampers, and is a maximum stepping force realization period.

Figure 7:
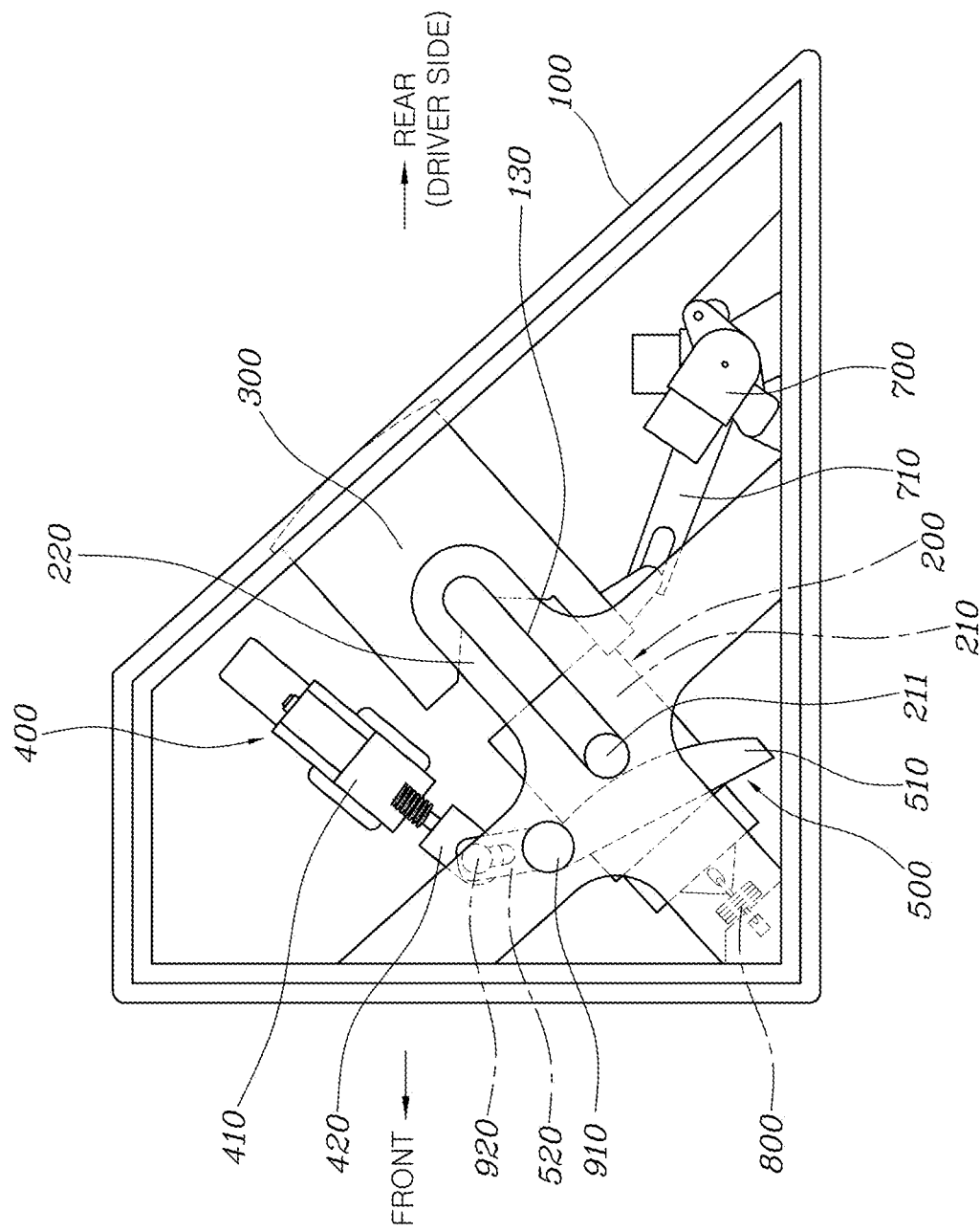
FIG. 7 is a view showing a hidden state in which the pedal pad is inserted into the pedal housing.

FIG. 7 is a view showing a hidden state in which the pedal pad 300 is inserted into the pedal housing 100 and thus exposure of the pedal pad 300 toward the interior space in which the driver is located is inhibited.

When supply of power to the linear type motor 410 is interrupted under control of the actuator control PCB 600, the plunger 420 is inserted into the linear type motor 410, i.e. the plunger 420 retreats, the state in which the high-load spring module 200 is supported by the rotary lever 500 is released at the time of retreat of the plunger 420, whereby the high-load spring module 200 is inserted into the pedal housing 100 through linear movement by elastic force of the return spring 800, and the pedal pad 300 is inserted into the pedal housing 100 through linear movement together with the high-load spring module 200. As a result, the pedal pad 300 is in a hidden state.

When the high-load spring module 200 is inserted into the pedal housing 100 through linear movement by elastic force of the return spring 800, the spring projection 211 moves along the guide hole 130. When the pedal pad 300 is in a hidden state, the spring projection 211 is located at the lowermost end of the guide hole 130.

When the pedal pad 300 is in a hidden state, as shown in FIG. 7, a wide space having no interference with the pedal is formed in the lower space of the driver's seat, whereby it is possible for the driver to take a comfortable rest in a relax mode. In addition, unintentional manipulation of the pedal is inhibited in an autonomous driving mode, whereby it is possible to improve safety.

Figure 8:
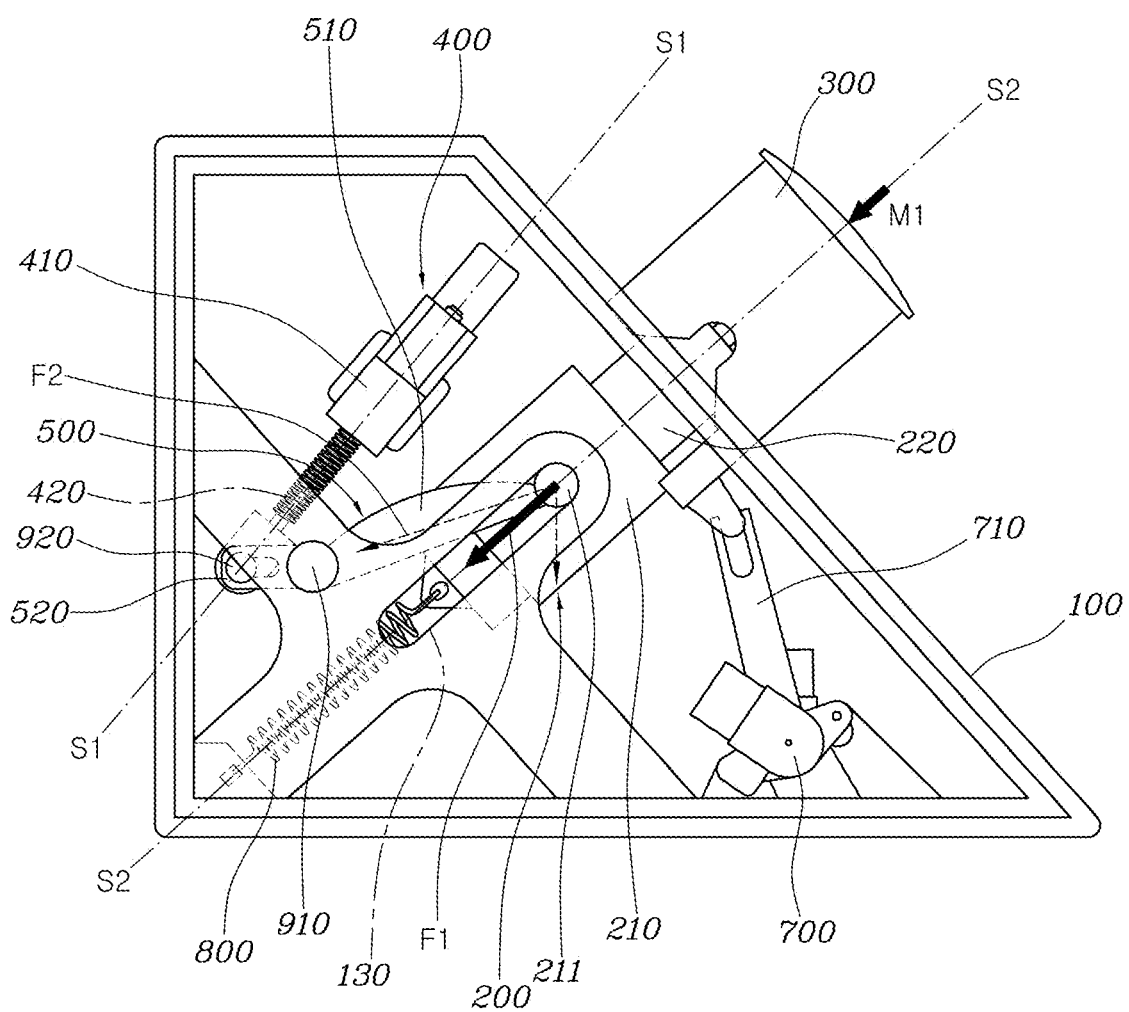
FIG. 8 is a view showing a pop-up state in which the pedal pad protrudes from the pedal housing in FIG. 7.

FIG. 8 is a view showing a pop-up state in which the pedal pad 300 protrudes from the pedal housing 100 and thus the pedal pad 300 is exposed toward the interior space in which the driver is located.

When power is supplied to the linear type motor 410 under control of the actuator control PCB 600, the plunger 420 protrudes from the linear type motor 410, i.e. the plunger 420 advances, the high-load spring module 200 protrudes from the pedal housing 100 through linear movement by rotation of the rotary lever 500 at the time of advance of the plunger 420, and the pedal pad 300 protrudes from the pedal housing 100 through linear movement together with the high-load spring module 200. As a result, the pedal pad 300 is in a pop-up state in which the pedal pad 300 is exposed to the driver side.

When the high-load spring module 200 protrudes from the pedal housing 100 through linear movement by rotation of the rotary lever 500, the high-load spring module 200 moves against elastic force of the return spring 800, since movement force of the high-load spring module 200 is higher than elastic force of the return spring 800, and the spring projection 211 moves upwards along the guide hole 130. When the pedal pad 300 pops up, the spring projection 211 is located at the uppermost end of the guide hole 130.

When the pedal pad 300 is in a pop-up state in which the pedal pad 300 protrudes form the pedal housing 100, as shown in FIG. 8, it is possible for the driver to step on a manipulation surface 310 of the protruding pedal pad 300 to thus perform normal manipulation.

Figure 9:
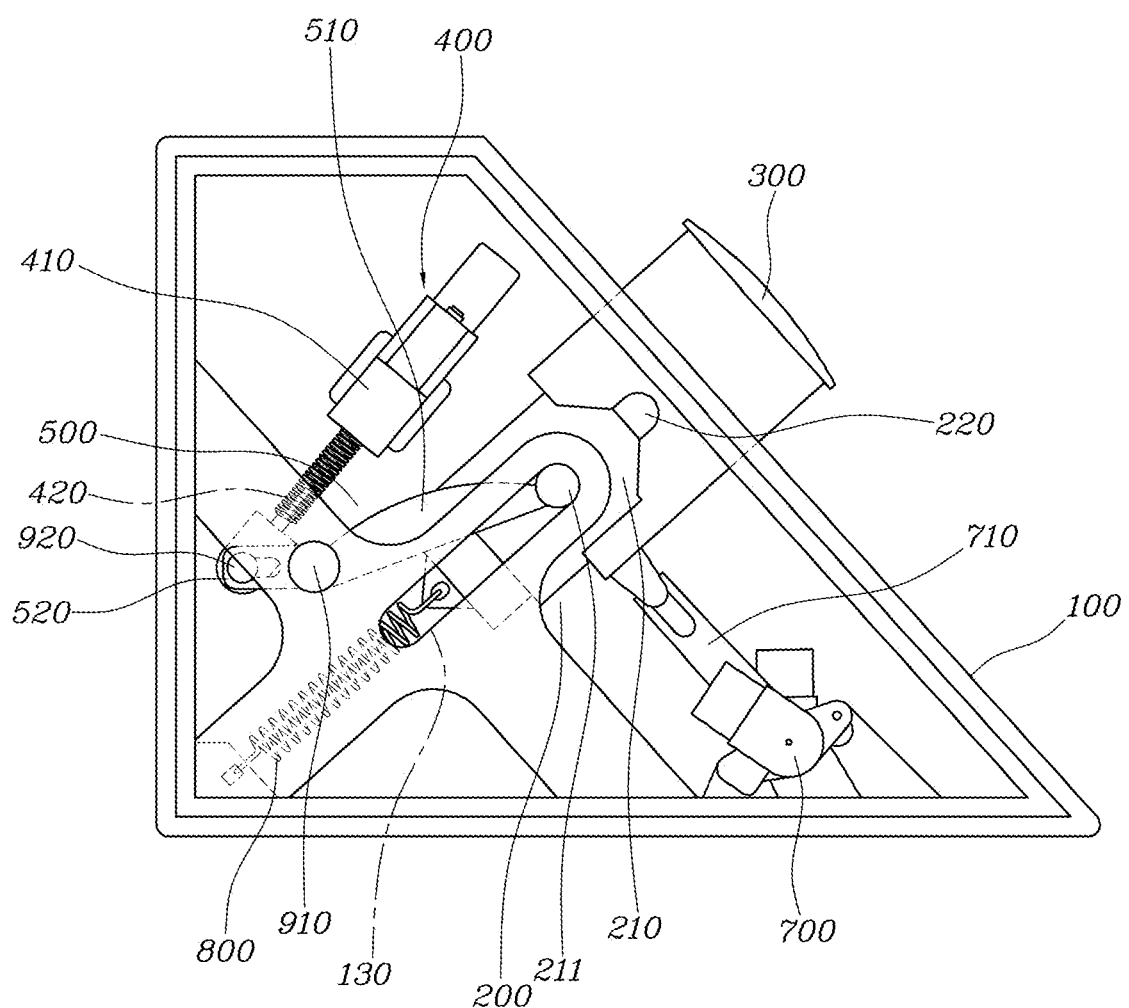
FIG. 9 is a view showing the state in which the pedal pad is rotated and normally operated by driver manipulation in FIG. 8.

FIG. 9 is a view showing the state in which the driver steps on the pedal pad 300 that has protruded from the pedal housing 100, i.e. the popped-up pedal pad 300, to manipulate the pedal pad 300.

When the driver steps on the popped-up pedal pad 300 to manipulate the pedal pad 300, the pedal pad 300 linearly moves toward the pedal housing 100 against elastic force of the high-load spring module 200. At this time, the high-load spring module 200 is compressed to generate stepping force. When the pedal pad 300 linearly moves, the sensor lever 710 connected to the pedal pad 300 is rotated. When the sensor lever 710 is rotated, the position of the permanent magnet coupled to the sensor lever 710 is changed. The pedal sensor 700 detects the operation (linear movement) of the pedal pad 300 through a change in the intensity of a magnetic field based on a change in the rotational position of the permanent magnet and generates a signal related to braking.

In one form of the present disclosure, the high-load spring module 200 and the pedal pad 300 linearly move together due to advance and retreat of the plunger 420 based on operation of the linear type motor 410. When the sensor lever 710 connected to the pedal pad 300 is rotated at the time of linear movement of the pedal pad 300, the pedal sensor 700 does not generate a signal related to braking in order to inhibit an accident due to unintentional manipulation.

That is, when the pedal pad 300 switches between a hidden state of FIG. 7 and a pop-up state of FIG. 8 based on operation of the actuator 400, the pedal sensor 700 does not generate a signal related to braking even though the sensor lever 710 is rotated by linear movement of the pedal pad 300, whereby it is possible to inhibit an accident due to unintentional manipulation.

However, in the situation in which the pedal pad 300 is in a pop-up state, as shown in FIG. 9, and the plunger 420 neither advances nor retreats as the result of the linear type motor 410 not being operated, the pedal sensor 700 generates a signal related to braking only when the pedal pad 300 linearly moves through driver manipulation and the rotary lever 500 connected to the pedal pad 300 is rotated. Consequently, it is possible to perform a more stable operation.

As described above, the foldable brake pedal apparatus for autonomous vehicles according to the present disclosure is configured such that, in a manual driving mode in which the driver directly drives a vehicle, the pedal pad 300 protrudes from the pedal housing 100 and thus pops up so as to be exposed to the driver side such that the driver can manipulate the pedal pad 300, and in an autonomous driving mode in which the driver does not directly drive the vehicle, the pedal pad 300 is inserted into the pedal housing 100 and thus is in a hidden state in which exposure of the pedal pad 300 toward the drive side is inhibited such that the driver cannot manipulate the pedal pad 300. In the autonomous driving mode, therefore, it is possible for the driver to take a comfortable rest. In addition, unintentional manipulation of the pedal is inhibited in the autonomous driving mode, whereby it is possible to improve safety.

Also, in the foldable brake pedal apparatus for autonomous vehicles according to the present disclosure, the high-load spring module 200 is used to generate stepping force. Consequently, it is possible to use a low-capacity motor used in a general foldable accelerator pedal apparatus, whereby it is possible to reduce cost.

Also, in the present disclosure, the actuator 400 is installed so as to be maximally parallel to the high-load spring module 200, and the high-load spring module 200 and the actuator 400 are connected to each other via the rotary lever 500 located between the high-load spring module 200 and the actuator 400. Consequently, it is possible to reduce the overall external size of the pedal apparatus based on an efficient layout structure. Furthermore, it is possible to increase the pop-up speed of the pedal pad 300 based on a short stroke of the actuator 400, whereby it is possible to improve responsiveness at the time of pop up.

As is apparent from the above description, a foldable brake pedal apparatus for autonomous vehicles according to the present disclosure is configured such that, in a manual driving mode in which a driver directly drives a vehicle, a pedal pad protrudes from a pedal housing and thus pops up so as to be exposed to the driver side such that the driver can manipulate the pedal pad, and in an autonomous driving mode in which the driver does not directly drive the vehicle, the pedal pad is inserted into the pedal housing and thus is in a hidden state in which exposure of the pedal pad toward the drive side is inhibited such that the driver cannot manipulate the pedal pad. In the autonomous driving mode, therefore, it is possible for the driver to take a comfortable rest. In addition, unintentional manipulation of the pedal is inhibited in the autonomous driving mode, whereby it is possible to improve safety.

Also, in the foldable brake pedal apparatus for autonomous vehicles according to the present disclosure, a high-load spring module is used to generate stepping force. Consequently, it is possible to use a low-capacity motor used in a general foldable accelerator pedal apparatus, whereby it is possible to reduce cost.

Also, in the present disclosure, an actuator is installed so as to be maximally parallel to the high-load spring module, and the high-load spring module and the actuator are connected to each other via a rotary lever located between the high-load spring module and the actuator. Consequently, it is possible to reduce the overall external size of the pedal apparatus based on an efficient layout structure. Furthermore, it is possible to increase the pop-up speed of the pedal pad based on a short stroke of the actuator, whereby it is possible to improve responsiveness at the time of pop up.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. A foldable brake pedal apparatus for autonomous vehicles, the foldable brake pedal apparatus comprising:
   a pedal housing fixedly installed in a lower space of a seat of a driver;
   a high-load spring module located in the pedal housing, and configured to be moved linearly relative to the pedal housing and to generate a stepping force;
   a pedal pad coupled to a first end of the high-load spring module, and configured to:
     be manipulated by a foot of the driver,
     move together with the high-load spring module when the high-load spring module moves linearly, and
     switch between a hidden state and a pop-up state;
   an actuator fixedly installed at a side of the high-load spring module in the pedal housing, and configured to generate power and to linearly move the high-load spring module; and
   a rotary lever configured to interconnect the high-load spring module and the actuator and transmit power from the actuator to the high-load spring module,
   wherein in the hidden state, the pedal pad is inserted into the pedal housing, and
   in the pop-up state, the pedal pad protrudes from the pedal housing.

2. The foldable brake pedal apparatus according to claim 1, wherein the pedal pad is a linear protrusion type pad configured to move through a housing hole formed in the pedal housing in a linear direction and to protrude from the pedal housing.

3. The foldable brake pedal apparatus according to claim 1, wherein
   the actuator is installed in parallel to the high-load spring module, and
   the rotary lever is configured to interconnect the high-load spring module and the actuator at a location between the high-load spring module and the actuator.

4. The foldable brake pedal apparatus according to claim 1, further comprising:
   an actuator control printed circuit board (PCB) fixedly installed in the pedal housing, and configured to be electrically connected to the actuator and to control operation of the actuator.

5. The foldable brake pedal apparatus according to claim 1, further comprising: a plurality of pedal sensors fixedly installed in the pedal housing,
   wherein each pedal sensor of the plurality of pedal sensors is connected to the pedal pad by a sensor lever, and is configured to:
     detect operation of the pedal pad through rotation of the sensor lever when the pedal pad linearly moves, and
     generate a signal related to braking.

6. The foldable brake pedal apparatus according to claim 5, further comprising:
   a return spring configured to extend in a longitudinal direction of the high-load spring module and to provide elastic force to the high-load spring module such that the high-load spring module is moved in a direction in which the high-load spring module is inserted into the pedal housing,
   wherein a first end of the return spring is coupled to a second end of the high-load spring module and the second end of the return spring is coupled to the pedal housing.

7. The foldable brake pedal apparatus according to claim 6,
   wherein the pedal housing is provided with a housing hole configured to allow the pedal pad to extend therethrough and a guide hole extending in a direction in which the pedal pad extends through the housing hole, and
   the high-load spring module is provided with a spring projection inserted into the guide hole and configured to move along the guide hole.

8. The foldable brake pedal apparatus according to claim 7, wherein the actuator comprises:
- a linear type motor fixedly installed in the pedal housing; and
- a plunger rotationally coupled to a first end of the rotary lever and configured to advance and retreat when the linear type motor is operated,
wherein: the rotary lever is rotated relative to the pedal housing when the plunger advances and retreats,
the high-load spring module moves linearly relative to the pedal housing based on rotation of the rotary lever, and
the pedal pad is configured to move linearly together with the high-load spring module and switch between a hidden state and a pop-up state.

9. The foldable brake pedal apparatus according to claim 8, wherein, when supply of power to the linear type motor is interrupted, the plunger is inserted into the linear type motor and the pedal pad is inserted into the pedal housing through linear movement together with the high-load spring module.

10. The foldable brake pedal apparatus according to claim 8, wherein, when power is supplied to the linear type motor, the plunger protrudes from the linear type motor, the high-load spring module protrudes from the pedal housing through linear movement by rotation of the rotary lever when the plunger protrudes, and the pedal pad protrudes from the pedal housing through linear movement together with the high-load spring module.

11. The foldable brake pedal apparatus according to claim 8, wherein
when the high-load spring module and the pedal pad linearly move together and the sensor lever connected to the pedal pad is rotated, the plurality of pedal sensors does not generate the signal related to braking, and
when the pedal pad is in the pop-up state and the plunger does not advance or retreat, the plurality of pedal sensors is configured to generate the signal related to braking only when the pedal pad linearly moves through driver manipulation and the rotary lever connected to the pedal pad is rotated.

12. The foldable brake pedal apparatus according to claim 8, wherein:
the rotary lever configured to be rotatable about a lever pin fixed to the pedal housing, and
the rotary lever comprises:
- a first lever portion extending to a first side of the lever pin, and configured to contact the spring projection and be connected to the high-load spring module; and
- a second lever portion extending to a second side of the lever pin and rotatably coupled to the plunger.

13. The foldable brake pedal apparatus according to claim 12, wherein a length of the first lever portion is greater than a length of the second lever portion.

14. The foldable brake pedal apparatus according to claim 12, wherein the lever pin is installed between a longitudinal axis of the actuator and a longitudinal axis of the high-load spring module.

15. The foldable brake pedal apparatus according to claim 12, wherein
when the pedal pad is in the pop-up state, a contact portion formed at an end of the first lever portion is configured to contact the spring projection and support the high-load spring module,
when the driver steps on the pedal pad while the pedal pad is in the pop-up state, a load is generated at the high-load spring module in a direction in which the pedal pad is inserted into the pedal housing along the guide hole, and
the first lever portion is configured to extend in a component force direction of the load generated at the high-load spring module while the pedal pad is in the pop-up state.

16. The foldable brake pedal apparatus according to claim 12, wherein:
a contact portion formed at an end of the first lever portion is in contact with the spring projection and configured to support the high-load spring module while the pedal pad is in the pop-up state, and
the contact portion of the first lever portion is configured in an arc identical to a radius of rotation of the first lever portion rotating around the lever pin.

17. The foldable brake pedal apparatus according to claim 16, wherein a lower corner of the contact portion is formed as a protrusion configured to protrude out of the radius of rotation of the first lever portion, to contact the spring projection, and to restrict a position of the rotary lever.

18. The foldable brake pedal apparatus according to claim 8, wherein the high-load spring module comprises:
- an outer cylinder, wherein the spring projection configured to contact a first lever portion of the rotary lever is inserted into the guide hole, and protrudes outwards from the outer cylinder;
- an inner cylinder having a first end inserted into the outer cylinder, coupled to the outer cylinder, ad configured to be moved in a longitudinal direction of the outer cylinder;
- a spring seat inserted into the inner cylinder and configured to be moved in a longitudinal direction of the inner cylinder;
- a connection rod configured to rotatably interconnect the spring seat and the pedal pad;
- a first spring located in the outer cylinder, wherein a first end of the first spring is supported by the outer cylinder and the second end of the first spring is supported by the inner cylinder;
- a second spring located in the inner cylinder, wherein a first end of the second spring is supported by the inner cylinder and the second end of the second spring is supported by the spring seat;
- a first damper fixedly installed in the outer cylinder and configured to be spaced apart from the inner cylinder; and
- a second damper fixedly installed in the inner cylinder and configured to be spaced apart from the spring seat.

19. The foldable brake pedal apparatus according to claim 18, wherein spring force of the second spring is set to be greater than spring force of the first spring.

20. The foldable brake pedal apparatus according to claim 18, wherein
when the driver manipulates the pedal pad in the pop-up state and the pedal pad linearly moves toward the pedal housing, the first spring is compressed to generate primary stepping force,
when the second spring is compressed after the first spring is compressed, secondary stepping force higher than the primary stepping force is generated, and
when the first damper and the second damper are compressed after the second spring is compressed, tertiary stepping force higher than the secondary stepping force is generated.

* * * * *

UNITED STATES PATENT AND TRADEMARK OFFICE
CERTIFICATE OF CORRECTION

| | | |
|---|---|---|
| PATENT NO. | : 11,305,647 B2 | Page 1 of 1 |
| APPLICATION NO. | : 17/147880 | |
| DATED | : April 19, 2022 | |
| INVENTOR(S) | : Eun Sik Kim et al. | |

It is certified that error appears in the above-identified patent and that said Letters Patent is hereby corrected as shown below:

In the Claims

In Column 16, Line 29:
ad configured to

Should be replaced with:
and configured to

Signed and Sealed this
Seventh Day of November, 2023

Katherine Kelly Vidal
*Director of the United States Patent and Trademark Office*